(12) United States Patent
Sutherland et al.

(10) Patent No.: US 8,815,183 B2
(45) Date of Patent: Aug. 26, 2014

(54) ZONED MONOLITHIC REACTOR AND ASSOCIATED METHODS

(75) Inventors: James Scott Sutherland, Corning, NY (US); Andrew David Woodfin, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 190 days.

(21) Appl. No.: 13/392,146

(22) PCT Filed: Aug. 31, 2010

(86) PCT No.: PCT/US2010/047203
§ 371 (c)(1),
(2), (4) Date: Feb. 24, 2012

(87) PCT Pub. No.: WO2011/026057
PCT Pub. Date: Mar. 3, 2011

(65) Prior Publication Data
US 2012/0148457 A1 Jun. 14, 2012

Related U.S. Application Data

(60) Provisional application No. 61/238,680, filed on Aug. 31, 2009.

(51) Int. Cl.
*B01J 19/00* (2006.01)
*B01J 19/24* (2006.01)

(52) U.S. Cl.
CPC .......... *B01J 19/2485* (2013.01); *B01J 19/0093* (2013.01); *B01J 2219/00873* (2013.01)
USPC ........... 422/603; 422/129; 422/177; 422/600; 422/187; 422/602

(58) Field of Classification Search
CPC .................. B01J 19/0093; B01J 2219/00873; B01J 19/2485
USPC .................. 422/129, 177, 187, 600, 602, 603
See application file for complete search history.

(56) References Cited

U.S. PATENT DOCUMENTS

| 4,041,592 A | 8/1977 | Kelm | 29/157.3 |
| 4,101,287 A | 7/1978 | Sweed et al. | 23/288 |

(Continued)

FOREIGN PATENT DOCUMENTS

| EP | 0677498 | 3/1995 | C04B 38/00 |
| EP | 0732138 | 3/1996 | B01D 53/22 |

(Continued)

*Primary Examiner* — Lessanework Seifu
(74) *Attorney, Agent, or Firm* — Gregory V. Bean

(57) ABSTRACT

A reactor formed within a honeycomb monolith is disclosed, the monolith having a plurality of parallel cells and comprising one or more process fluid paths lying within closed cells of the monolith and extending laterally from cell to cell, the monolith having porous walls that are coated with a non-porous coating in at least a first zone along the one or more process fluid paths and that remain porous in at least a second zone along the one or more process fluid paths, the porous walls in the second zone adapted to allow permeate in a respective process fluid path to pass through the porous walls. A method of forming a reactor in a honeycomb monolith is also disclosed, including providing a porous honeycomb monolith having cells extending in a common direction divided by cell walls, forming a process fluid path within closed cells of the monolith extending laterally from cell to cell, coating the cell walls of the monolith within at least a first zone along the process fluid path within the monolith with a non-porous coating, and allowing the at least some cell walls of the monolith within a second zone along the process fluid path to remain porous.

17 Claims, 6 Drawing Sheets

(56) References Cited

U.S. PATENT DOCUMENTS

| | | | |
|---|---|---|---|
| 4,421,702 A | 12/1983 | Oda et al. | 264/62 |
| 4,509,966 A | 4/1985 | Dimick et al. | 55/502 |
| 4,718,926 A | 1/1988 | Nakamoto et al. | 55/523 |
| 4,781,831 A | 11/1988 | Goldsmith | 210/247 |
| 4,902,417 A | 2/1990 | Lien | 210/321.74 |
| 5,198,007 A | 3/1993 | Moyer et al. | 55/523 |
| 6,126,833 A | 10/2000 | Stobbe et al. | 210/650 |
| 6,454,941 B1 | 9/2002 | Cutler et al. | 210/266 |
| 8,534,307 B2 * | 9/2013 | Caze et al. | 137/15.18 |
| 2002/0031455 A1 | 3/2002 | Hippel et al. | 422/173 |
| 2002/0036078 A1 | 3/2002 | Janezich et al. | 165/164 |
| 2002/0178707 A1 | 12/2002 | Vance et al. | 55/523 |
| 2004/0034111 A1 | 2/2004 | Tonkovich et al. | 518/726 |
| 2004/0068971 A1 | 4/2004 | Kuki et al. | 55/523 |
| 2004/0071611 A1 | 4/2004 | Hirose et al. | 422/180 |
| 2004/0076562 A1 | 4/2004 | Manzanec et al. | 422/211 |
| 2004/0231374 A1 | 11/2004 | Chang et al. | 68/23.3 |
| 2005/0072734 A1 | 4/2005 | Goldsmith et al. | 210/650 |
| 2005/0103232 A1 | 5/2005 | Gadkaree et al. | 106/600 |
| 2005/0191461 A1 | 9/2005 | Kasai et al. | 428/116 |
| 2006/0090651 A1 | 5/2006 | Liu et al. | 96/121 |
| 2006/0233700 A1 | 10/2006 | Chellappa et al. | 423/648.1 |
| 2006/0272306 A1 | 12/2006 | Kirk et al. | 55/523 |
| 2007/0169451 A1 | 7/2007 | Bardon et al. | 55/523 |
| 2008/0010960 A1 | 1/2008 | Paisley et al. | 55/523 |
| 2008/0020922 A1 | 1/2008 | Li et al. | 502/73 |
| 2008/0072551 A1 | 3/2008 | Zuberi | 55/385.1 |
| 2008/0110143 A1 | 5/2008 | Chen et al. | 55/385.1 |
| 2008/0148700 A1 | 6/2008 | Ziebarth | 55/523 |
| 2010/0143215 A1 | 6/2010 | Caze et al. | 422/198 |
| 2011/0029035 A1 | 2/2011 | Vollkron et al. | 607/25 |
| 2011/0306088 A1 | 12/2011 | Chen et al. | 435/41 |

FOREIGN PATENT DOCUMENTS

| | | | |
|---|---|---|---|
| EP | 0732139 | 3/1996 | B01D 53/22 |
| EP | 0923983 | 12/1998 | B01D 71/02 |
| EP | 1029975 | 12/1999 | D21F 1/70 |
| EP | 1070687 | 6/2000 | C04B 38/00 |
| JP | 2000/225327 | 8/2000 | B01D 71/02 |
| WO | 93/07959 | 4/1993 | B01D 71/02 |
| WO | 95/06510 | 3/1995 | B01D 46/24 |
| WO | 01/53233 | 7/2001 | C04B 38/00 |
| WO | 2005/099789 | 10/2005 | A61M 1/34 |
| WO | 2010/002362 | 1/2010 | B01J 10/02 |
| WO | 2010/024935 | 3/2010 | B01J 10/02 |

* cited by examiner

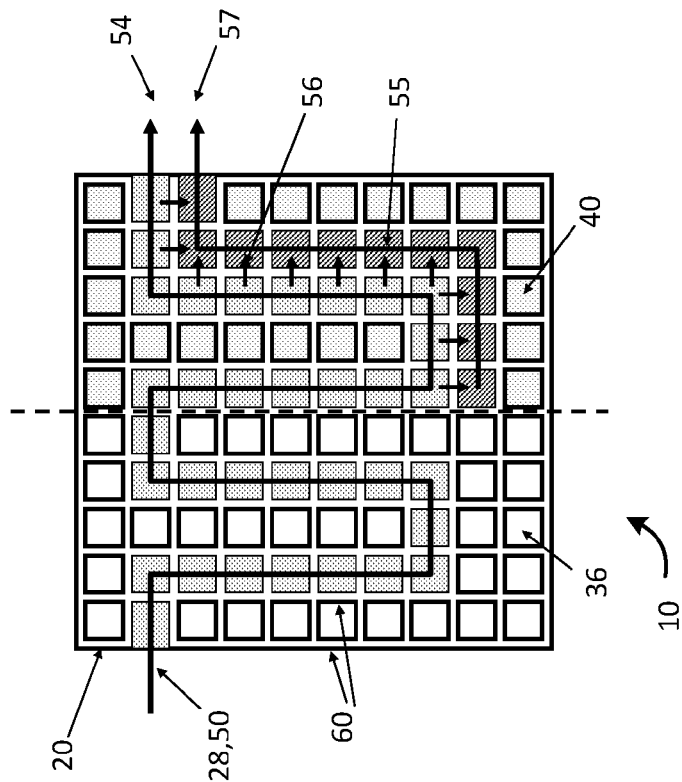
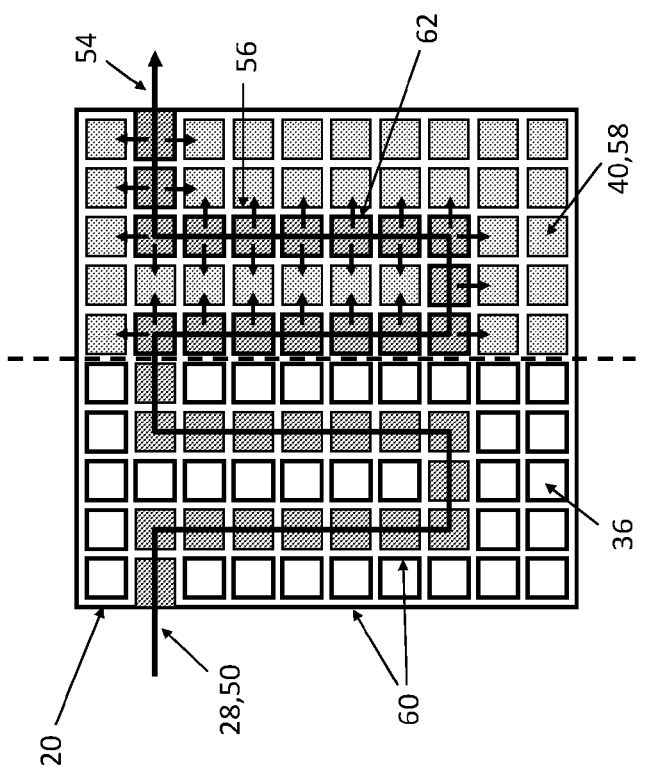

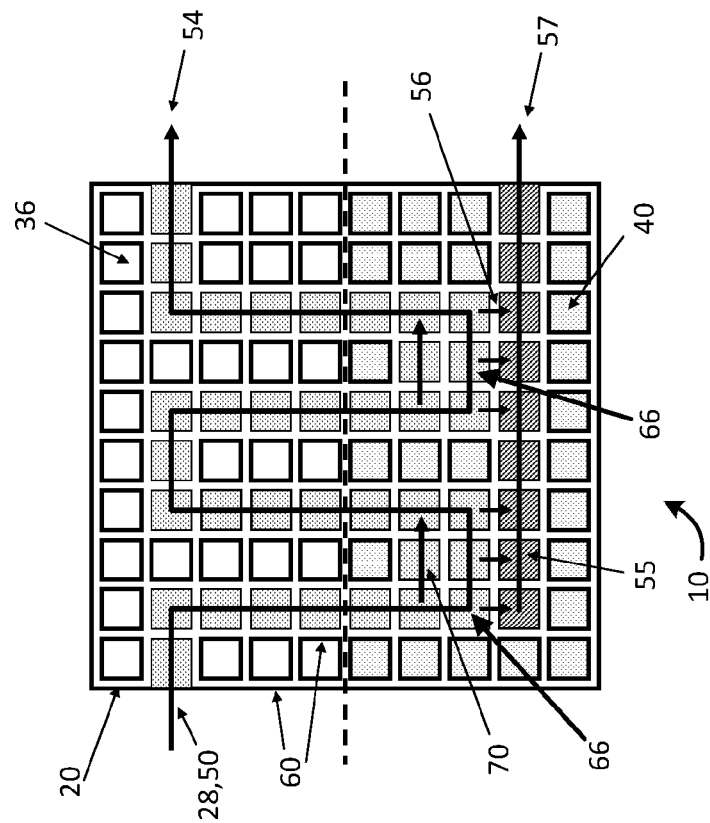
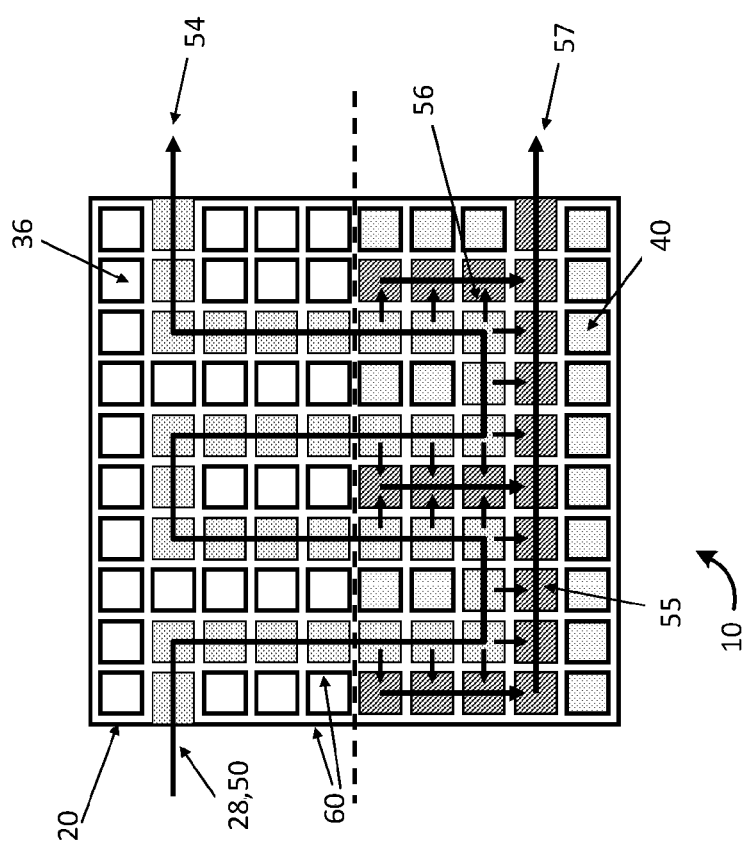

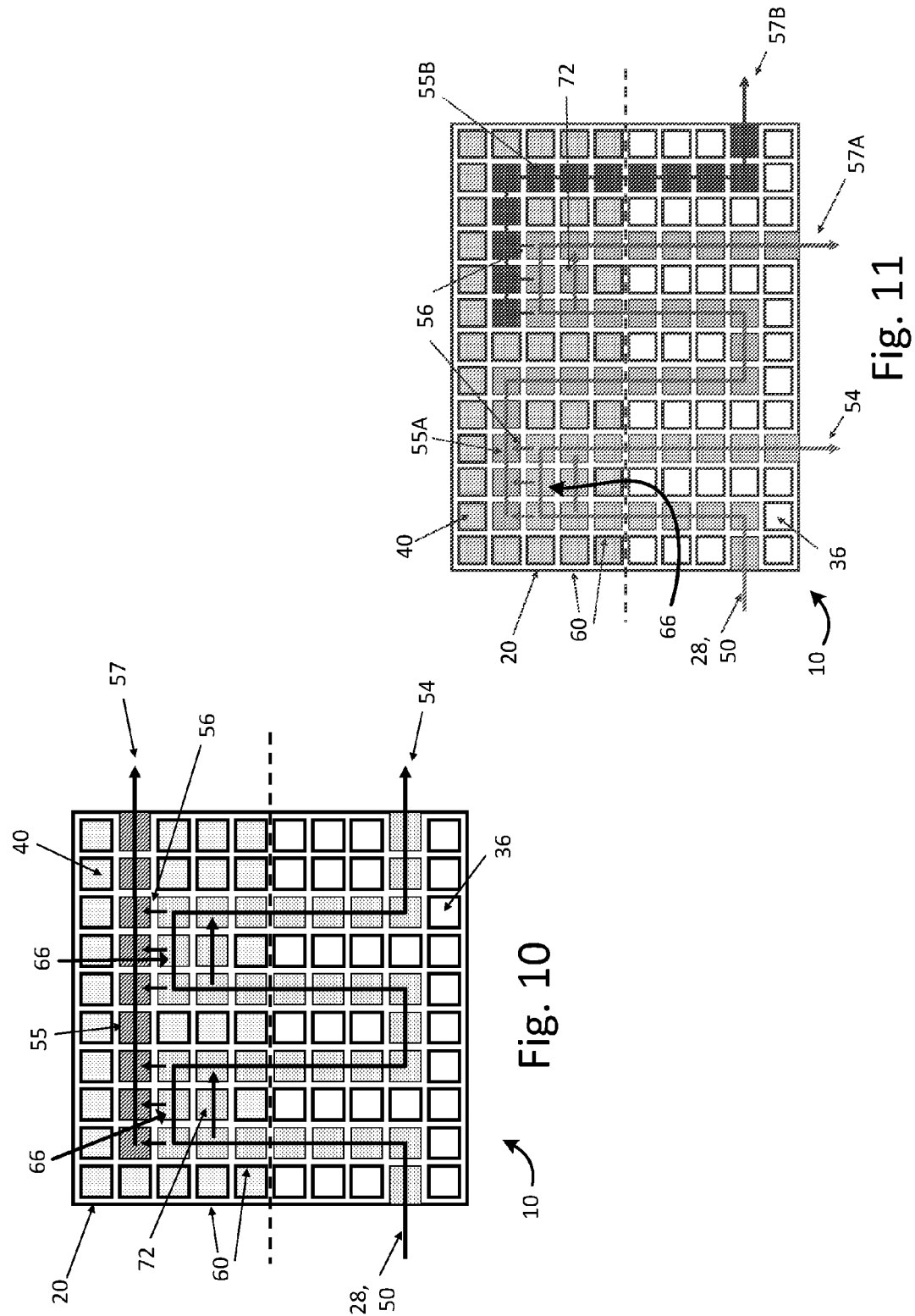

ZONED MONOLITHIC REACTOR AND ASSOCIATED METHODS

PRIORITY

This application claims priority to U.S. patent application Ser. No. 61/238,680, filed Aug. 31, 2009, titled "ZONED MONOLITHIC REACTOR AND ASSOCIATED METHODS".

BACKGROUND

The present invention relates in general to integration of multiple different zones into a honeycomb extrusion monolith-based chemical reactor and methods to achieve such, and in particular to multiple zones in a honeycomb monolith reactor that provide distinct functions such as integrated and zoned separation or heat exchange, and to methods for making such reactors.

Techniques for fabricating low-cost continuous flow chemical reactors based on extruded honeycomb monoliths have been presented previously by the present inventors and/or their colleagues, for example, as disclosed in EPO Publication No. 2098285, assigned to the present assignee. With reference to FIG. 1, which is a perspective cut-away view of such a device, in a reactor 10 of this type formed within a monolith substrate 18, fluid flows in millimeter-scale channels 22, 24. At least one fluid path 28 is formed, typically having periodic U-bends created by machining end face regions of the reactor substrate 18 and then selectively plugging channels 24 with plugs or plugging material 26, as shown in the figure. This approach allows long, large volume serpentine fluid passages such as passage or path 28, useful for process fluids, to be formed within channels 24 closed by the plugs or plugging material 26, with many millimeter-scale open channels 22 adjacent to the channel(s) 24 containing path 28, useful for flowing heat exchange fluid 30 through. Alternatively, reactant may flow parallel to the extrusion direction in the short straight channels 22, while heat exchange fluid flows through the path 28. The first of these two configurations is generally preferred where longer residence times or higher heat exchange is required. As shown in the cross-sectional view of a similar reactor 10 in FIG. 2, with the cross-section taken through the channels closed by plugs 26 or plugging material 26 and containing the path 28, the path 28, which is typically the process fluid path, need not be limited to following a single channel of the monolith substrate 18 at a time, but can follow groups 25 of two or more channels in parallel (with groups 25 of two shown in this case), with U-bends 29 allowing flow from one group of the next. As shown in the cross-sectional view of a similar reactor 10 in FIG. 3, with the cross-section again taken through the channels closed by plugs 26 or plugging material 26 and containing the path 28, the path 28 need not follow the original direction of the channels of the substrate 18 at all, but may pass in a direction perpendicular to the channels of the substrate without the need of U-bends in the path 28. Such a structure may be provided by deep machining of alternate walls of the cells of the substrate 18 followed by plugging with plugs 26 or plugging material 26, such as disclosed and described by the present inventor and/or colleagues in U.S. Pat. Publication No. 20100135873, assigned to the present assignee.

The present disclosure aims to add to the range of application of reactors of this type by providing individually controlled and/or tailored zones within a single monolith for improved reaction performance.

SUMMARY

One embodiment includes a reactor formed within a honeycomb monolith, the monolith having a plurality of parallel cells and comprising one or more process fluid paths lying within closed cells of the monolith and extending from cell to cell within said closed cells. The monolith further has porous walls that (1) are coated with a non-porous coating in at least a first zone along the one or more paths and that (2) remain porous in at least a second zone along the process fluid path. The porous walls in the second zone are adapted to allow permeate in the respective process fluid path to pass through the porous walls. A further embodiment includes a method of forming a reactor in a honeycomb monolith by providing a porous honeycomb monolith having cells extending in a common direction divided by cell walls, forming a process fluid path within closed cells of the monolith extending laterally from cell to cell, coating the cell walls of the monolith within at least a first zone along the process fluid path within the monolith with a non-porous coating, and allowing the at least some cell walls of the monolith within a second zone along the process fluid path to remain porous. The porous walled portions of the process fluid path(s) may be structured so as to cause either high or low density fluids to pass out of the respective process fluid path, allowing for easy removal of desired or undesired products.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 5 is a diagrammatic plan or endwise view of a reactor 10 formed in a porous honeycomb monolith or substrate 20, showing use of zoned heat exchange and separation using a sweep flow in the reactor;

FIG. 6 is a diagrammatic plan or endwise view of a reactor 10 formed in a porous honeycomb monolith or substrate 20, showing use of zoned heat exchange and separation using a specific permeate path 55 and outlet 57;

FIG. 8 is a diagrammatic plan or endwise view of a reactor 10 formed in a porous honeycomb monolith or substrate 20, showing use of repeating zoned heat exchange and separation in cooperation with a single permeate path 55 and outlet 57;

FIG. 9 is a diagrammatic plan or endwise view of a reactor 10 similar to that of FIG. 6 but including low-density bypasses 70 along the process fluid path 28;

FIG. 10 is a diagrammatic plan or endwise view of a reactor 10 similar to that of FIG. 9 but including high-density bypasses 72 along the process fluid path 28; and FIG. 11 is a diagrammatic plan or endwise view of a reactor 10 having successive high density bypasses and low-density permeate paths along successive permeate paths, useful to repeatedly remove excess liquid from a liquid-generating gas phase reaction.

DETAILED DESCRIPTION

Figure 1:
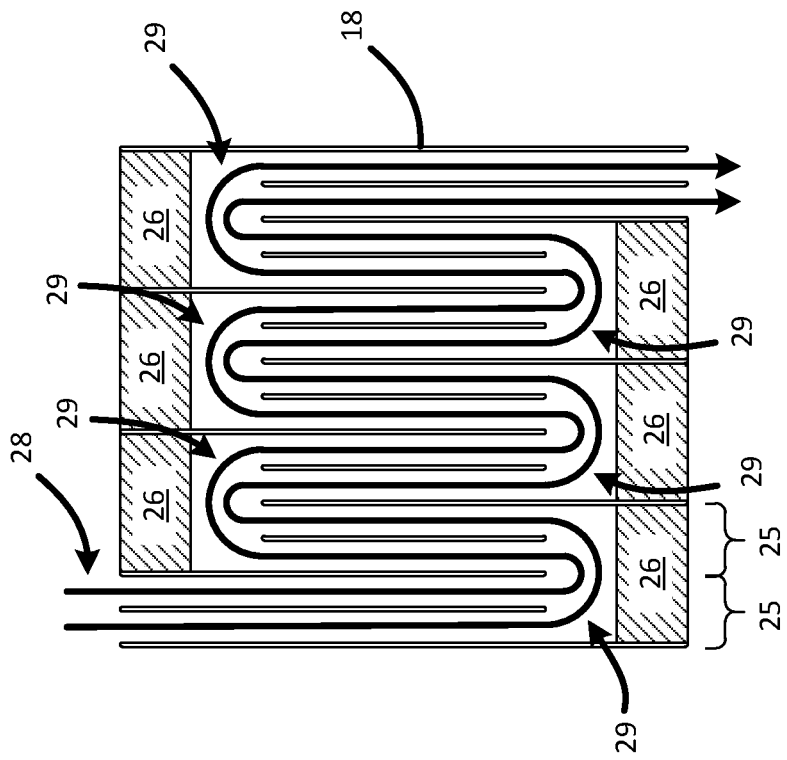
FIG. 1 is a perspective cut-away view of a portion of a reactor 10 of the type with which the present disclosure is concerned.

Reference will now be made in detail to the accompanying drawings which illustrate certain instances of the methods and devices described generally herein. Whenever possible, the same reference numerals will be used throughout the drawings to refer to the same or like parts.

Figure 4:
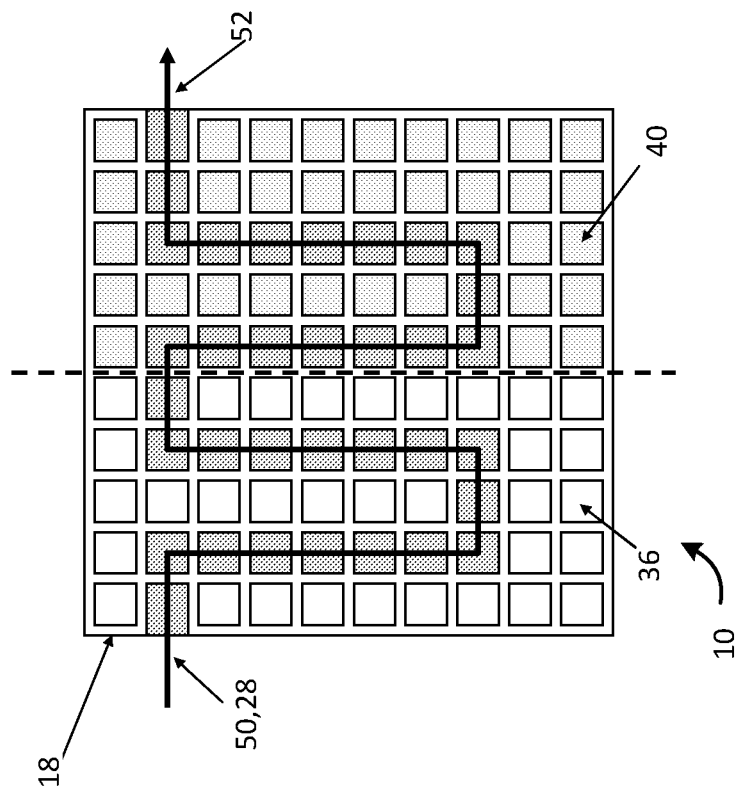
FIG. 4 is a diagrammatic plan or endwise view of a reactor 10 formed in a honeycomb monolith or substrate 18 showing use of zoned heat exchange in the reactor.

A honeycomb extrusion substrate-based chemical reactor can be designed to provide multiple functional zones along one or more internal process fluid paths. FIG. 4 shows a schematic end-on view of a reactor 10 formed in a honeycomb monolith or substrate 18, having a single process fluid channel 28 running through a non-porous substrate 18 where multiple zones are provided for heat exchange. The process fluid channel 28 may have a serpentine pattern in a plane running along the cells of the monolith, as in FIGS. 1 and 2, or not, as in FIG. 3. The process fluid enters at process flow inlet 50 at the left side of the substrate 18 in a first zone 36 where a heat exchange fluid flow is flowing into the page in short straight channels, supplied at temperature T1. The reactant fluid then flows along the path 28 to the right side of the substrate 18, entering a second zone 40 where the heat exchange fluid flows in the short straight channels at temperature T2. This form of zoned temperature control along the process fluid path may be important for implementing complex multi-stage reactions along a single process fluid path 28.

With reference to FIG. 5, using a porous substrate 20 in place of a nonporous one, fluidic separation can be performed at selected locations along a process fluid path 28. In a practical chemical reactor a fluid separation step may occur directly after a reaction zone that is held at fixed temperature via heat exchange fluid flow. FIG. 5 shows this type of reactor, again from a schematic plan view looking directly down the cells of a monolith 20. At entrance 50, reactant fluid immediately enters a first controlled temperature zone 36 on the left side of the substrate 20. All heat exchange channels in this zone 36 adjacent the reactant passage 28 are coated with a non-porous coating 60 (indicated by the thick lines on the cell walls) to prevent reactant leakage into the heat exchange channels. As the reactant fluid flows along the process fluid path 28 in this first zone 36, one or more reaction products are generated.

Next the reactant fluid enters a fluid separation zone on the right side of the substrate 20. The internal channel walls of the process fluid path in this second zone 40 are coated with a membrane 62 in the form of a membrane washcoat to enable the desired fluid separation. Alternately, internal walls of the permeate or sweep fluid channels 58 within the second zone 40 may be coated with a membrane layer. Permeate fluid flows through the substrate walls as indicated by the arrows and into adjacent short straight channels, where it is carried out of the substrate by sweep fluid flow. Remaining retentate fluid continues along the process fluid path 28 until it exits the substrate 20 at retantate fluid outlet 54. Depending on the application and type of permeate flow, the heat exchange fluid and permeate sweep fluid may be the same fluid or two different fluids.

Figure 2:
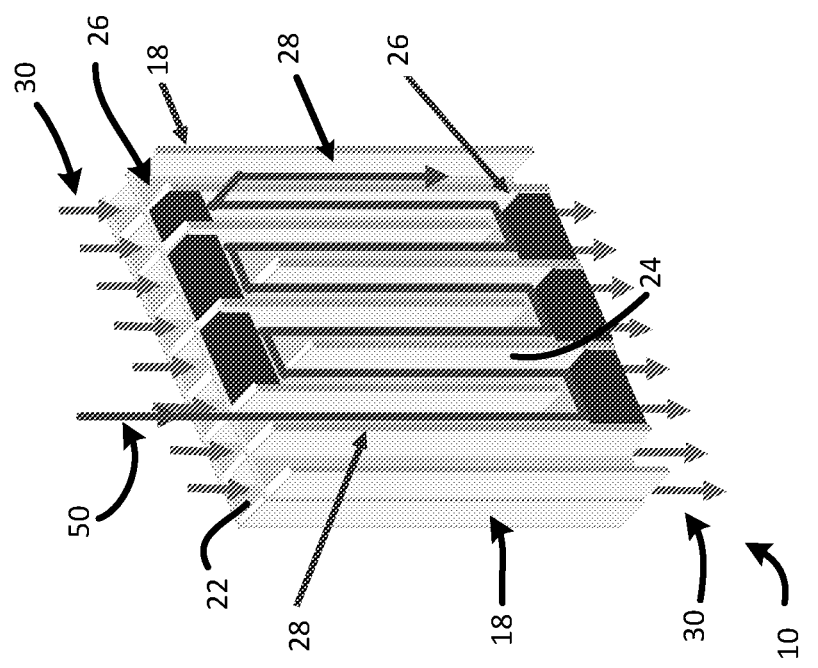
FIG. 2 is a cross-sectional view of a portion of another reactor 10 of the type with which the present disclosure is concerned.
Figure 3:
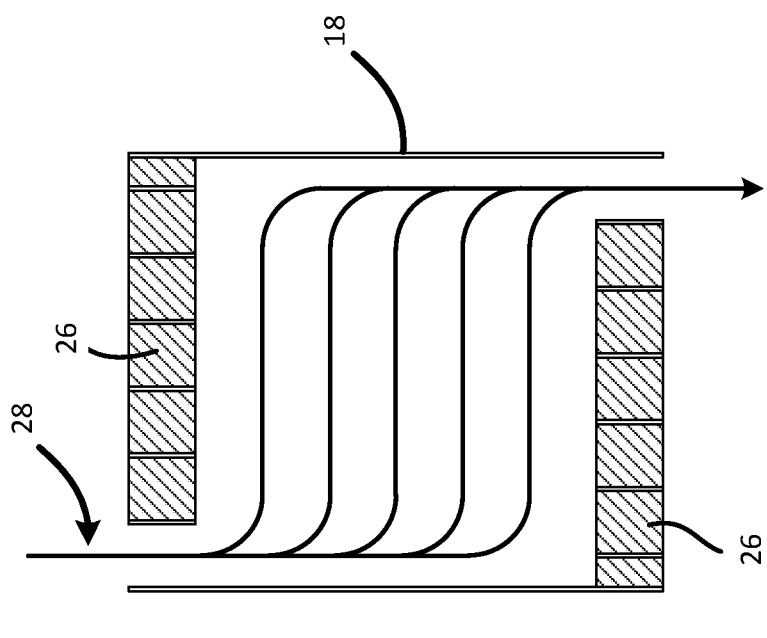
FIG. 3 is a cross-sectional view of a portion of still another reactor 10 of the type with which the present disclosure is concerned.

Successive thermal and separation zones such as shown and discussed with respect to FIGS. 2 and 3 can be merged in a configuration such as that shown in FIG. 6. Reactant fluid is held at first temperature T1 on the left side of the substrate 20 in a first zone 36, by heat exchange fluid flowing in the short straight paths of the monolith 20. Fluid separation on the right side of the substrate, in a second zone 40, is carried out at a second temperature T2. Permeate fluid passes through substrate walls as indicated by arrows 56 and into a permeate fluid collection channel 55 that runs adjacent to the process channel 28 or process fluid path 28 to a permeate fluid outlet 57. This embodiment allows the temperatures of the left side reaction zone and right side separation zone to be different in order to optimize reaction and separation conditions in the two zones 36, 40.

Figure 7:
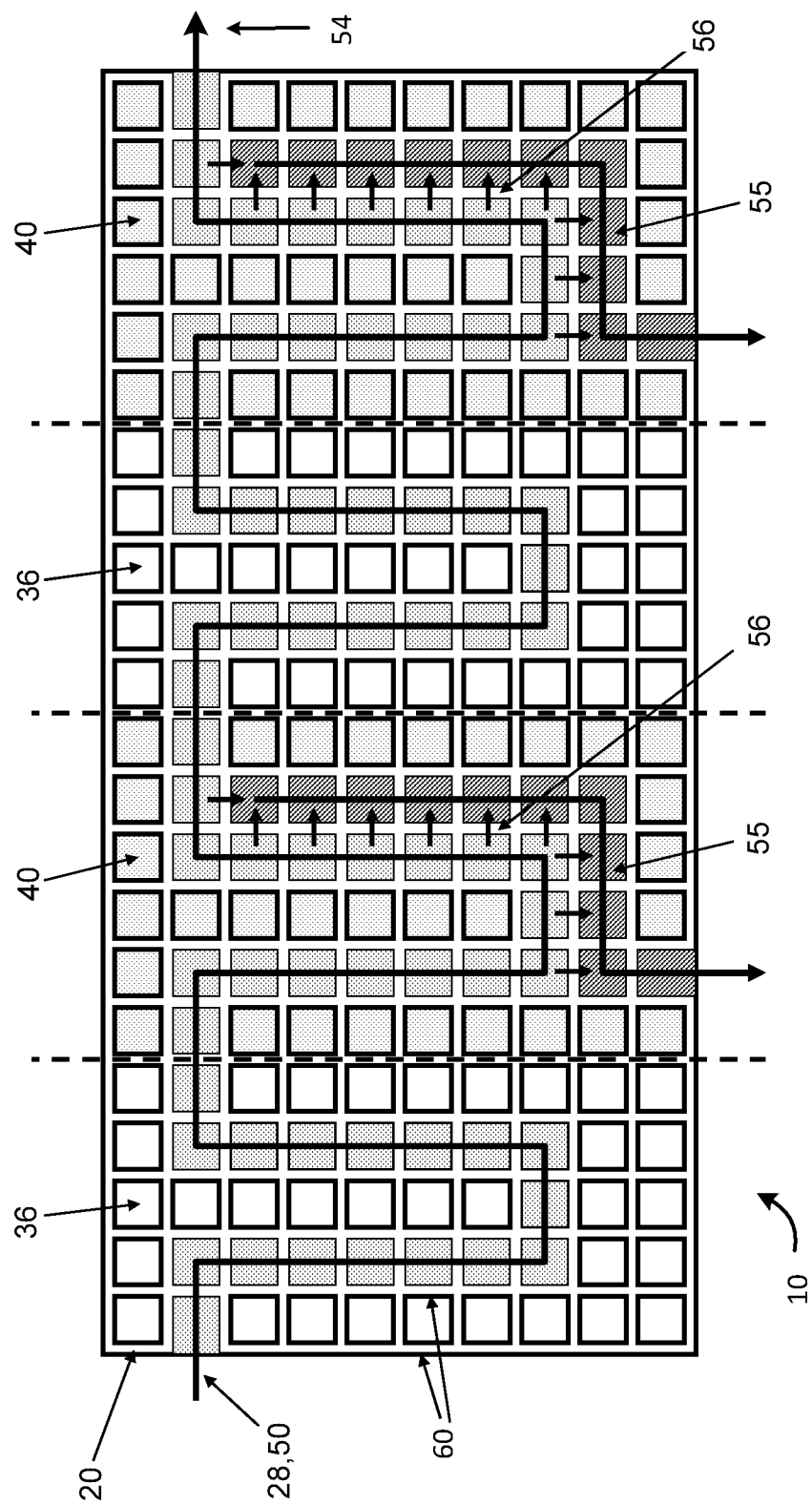
FIG. 7 is a diagrammatic plan or endwise view of a reactor 10 formed in a porous honeycomb monolith or substrate 20, showing use repeating zoned heat exchange and separation using multiple permeate paths 55.

The use of distinct reaction and/or fluid separation zones along the process fluid path that are held at different temperatures may be extended to many zones as shown in FIG. 7. Multiple fluid separation zones 36, 40 may be used to boost reactor selectivity by removing reaction products as they are generated along the process fluid path 28. This approach can help to prevent reaction products generated early in the process fluid path from participating in side reactions that yield undesirable products, or from reducing the overall efficiency of target reaction product generation.

A variation of a multi-zoned reactor is shown in FIG. 8, where multiple reaction and fluid separation sections are arranged so that all reaction sections can share one heat exchange fluid zone 36 while all fluid separation sections share a different heat exchange fluid zone 40. While not shown in the figure, as mentioned above, the substrate channels that make up the process fluid path 28 within the fluid separation zones may be washcoated or otherwise provided with membranes to enhance separation selectivity. In the embodiment of FIG. 8, multiple permeate feeds join one permeate collection channel 55, eventually exiting at permeate fluid outlet 57.

Additional separation functions may be implemented when the porous honeycomb extrusion substrate is oriented horizontally (i.e., so that substrate long straight channels, that is, the native channels of the honeycomb, run horizontally, or at least sufficiently far from vertically). FIG. 9 shows a multi-zoned reactor configuration where fluid separation in the second or lower zone, zone 40, is gravity assisted. High density reactant fluids are trapped in the lower portion of the fluid separator U-turn channel structures, where they flow through the walls of the porous substrate 20 and enter an adjacent permeate fluid collection channel 55. It should be noted that the U-turn channel structures 66 are U-turn structures within a plane perpendicular to the direction of the channels or cells of the monolith 20. This is in contrast to the U-bends 29 as seen in FIGS. 1 and 2, which are U-bends within a plane parallel to the direction of the channels or cells of the monolith. U-bends 29 as in FIGS. 1 and 2 may be used in transitioning from channel to channel the within the monolith 20 of the embodiment of FIG. 9, but direct flow across channels may also be employed as an alternative embodiment, corresponding to FIG. 3. In either case, low density reactant fluids flow through the low density bypass 70 of the U-turn structure 66 (the bypass 70 being in the form of a passage both bypassing and lying above the lowest portion of the U-turn structure 66) and continue along the process fluid path 28. This embodiment may be particularly useful for liquid-gas separation of a reaction product, with gas-phase retentate remaining in process fluid path 28 until it exits the substrate 20 at retentate outlet 54 or process fluid outlet 54.

In a similar configuration, FIG. 10 shows a multi-zoned reactor embodiment where fluid separation in the second or upper zone 40 is gravity assisted. Low density reactant fluid rises to the top of each U-turn channel structure 66, where it flows through the porous substrate and enters an adjacent permeate fluid collection channel 55. High density reactant fluids flow through the high density bypass 72 of the U-turn structure (the bypass 72 being in the form of a passage both bypassing and lying below the highest portion of the U-turn structure), constrained by gravity to the lower portion of the U-turn and accordingly unable to enter the permeate channel 55. The high density fluid continues along the process fluid path 28 until it exits the substrate as a retentate flow at the retentate fluid outlet 54.

As a further example, consider a gas-phase reaction where a liquid-phase by-product is generated at a high rate so that its presence impedes the progress of the reaction. The multi-stage fluid separation configuration shown in FIG. 11 provides a series of temperature-controlled reaction zones and fluid separation zones. Fluid flow through the reactor may be described as follows:

The gas-phase reactant enters the substrate 20 at entrance 50. In the first zone or reaction zone 36 at the bottom of the substrate 20, excess liquid-phase reaction by-product is generated. In the second zone or first fluid separation zone 40 (optionally operated at a different temperature than the first zone or reaction zone 36 to promote condensation or precipitation), the low density gas phase reactant and reaction product pass through the porous substrate wall as indicated by the arrows 56 and into the adjacent first permeate fluid collection channel 55A. Since the liquid-phase by-product is heavier than the gas it is constrained by gravity to the high-density bypass 72 in the lower portion of the U-turn structure 66. The liquid by-product continues along the fluid collection channel until it exits the substrate at retentate fluid outlet 54. The first gas-phase permeate fluid flow in channel 55A continues on to the second reaction phase within what then becomes the process fluid path of the second stage. As in the first stage, any unwanted liquid-phase by-product is removed from the channel using the gravity-assisted high-density bypass 72 of the U-turn structure while the gas-phase permeate flows into the second (or any successive) permate fluid collection channel 55B. This process of reaction followed by gravity-assisted liquid-gas separation continues as the fluid flows through any desired number of successive reaction and fluid separation zones. Eventually the desired gas-phase product exits the substrate 20 on the right side at the second (or at the nth or last) permeate fluid outlet 57B.

The methods and/or devices disclosed herein are generally useful in performing any process that involves mixing, separation, extraction, crystallization, precipitation, or otherwise processing fluids or mixtures of fluids, including multiphase mixtures of fluids—and including fluids or mixtures of fluids including multiphase mixtures of fluids that also contain solids—within a microstructure. The processing may include a physical process, a chemical reaction defined as a process that results in the interconversion of organic, inorganic, or both organic and inorganic species, a biochemical process, or any other form of processing. The following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be performed with the disclosed methods and/or devices: polymerisation; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydroformylation; carboxylation; decarboxylation; amination; arylation; peptide coupling; aldol condensation; cyclocondensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; and enzymatic reactions.

It will be apparent to those skilled in the art that various modifications and variations can be made without departing from the spirit or scope of the invention.

What is claimed is:

1. A reactor formed within a honeycomb monolith, the monolith having a plurality of parallel cells and comprising one or more process fluid paths lying within cells that are closed at the ends of the monolith and extending laterally within the monolith from cell to cell, the monolith having porous walls, the porous walls being coated with a non-porous coating in at least a first zone within the reactor along the one or more process fluid paths and remaining porous in at least a second zone along the one or more process fluid paths, the porous walls in the second zone positioned so as to allow permeate in the respective one or more paths to pass through the porous walls.

2. The reactor according to claim 1 wherein the one or more process fluid paths comprise one or more serpentine process fluid paths running back and forth along successive ones or groups of closed cells of the monolith.

3. The reactor according to claim 1 wherein the porous walls within the second zone are so adapted and positioned as to allow permeate to pass through into one or more sweep flow channels within the monolith positioned along the respective one or more process fluid paths.

4. The reactor according to claim 1 wherein the porous walls within the second zone are so adapted and positioned as to allow permeate to pass through into multiple sweep flow channels within the monolith positioned along the respective one or more process fluid paths.

5. The reactor according to claim 1 wherein the porous walls within the second zone are so adapted and positioned as to allow permeate to pass through into a permeate channel running at least in part parallel along the respective one or more process fluid paths.

6. The reactor according to claim 5 wherein the permeate channel is arranged for counter-current flow relative to the respective process fluid path.

7. The reactor according to claim 5 wherein the permeate channel is arranged for co-current flow relative to the respective process fluid path.

8. The reactor according to claim 6 wherein the permeate channel is provided with a sweep current flow relative to the process fluid path.

9. The reactor according to claim 1 wherein the cells of the monolith are aligned other than in the direction of gravity, and wherein the process fluid path comprises one or more U-turns in a plane perpendicular to said cells and at least one low-density bypass in the form of a bypass passage bypassing and lying above the lowest portion of one of said one or more U-turns.

10. The reactor according to claim 1 wherein the cells of the monolith are aligned other than in the direction of gravity, and wherein the process fluid path comprises one or more U-turns and at least one high-density bypass in the form of a bypass passage bypassing and lying below the highest portion of one of said one or more a U-turns.

11. The reactor according to claim 9 wherein the cells of the monolith are aligned perpendicularly to the direction of gravity.

12. The reactor according to claim 1 wherein the reactor further comprises one or more thermal control fluid paths lying within cells of the monolith adjacent to the or more process fluid paths.

13. The reactor according to claim 12 wherein the one or more thermal control fluid paths comprise at least first thermal control fluid path within the first zone and at least a second thermal control fluid path within the second zone of the reactor.

14. The reactor according to claim 1 wherein the reactor comprises multiple successive first and second zones in succession along the process fluid path.

15. A method of forming a reactor in a honeycomb monolith, the method comprising
providing a porous honeycomb monolith having cells extending in a common direction divided by cell walls;
closing some of the cells of the monolith and forming a process fluid path within closed cells of the monolith, the path extending laterally from cell to cell;
coating the cell walls of the monolith within at least one zone along the path with a non-porous coating; and
allowing the at least some cell walls of the monolith within a second zone along the path to remain porous.

16. A reactor formed within a honeycomb monolith, the monolith having a plurality of parallel cells and comprising one or more process fluid paths lying within cells that are closed at the ends of the monolith and extending laterally within the monolith from cell to cell, the monolith having porous walls, the porous walls being coated with a non-porous coating in at least a first zone within the reactor along the one or more process fluid paths and remaining porous in at least a second zone along the one or more process fluid paths, the porous walls in the second zone positioned so as to allow permeate in the respective one or more paths to pass through the porous walls, wherein the cells of the monolith are aligned other than in the direction of gravity, and wherein the process fluid path comprises one or more U-turns and at least 1) one low-density bypass in the form of a bypass passage bypassing and lying above the lowest portion of one of said one or more U-turns, or 2) one high-density bypass in the form of a bypass passage bypassing and lying below the highest portion of one of said one or more a U-turns.

17. The reactor according to claim 16 wherein the cells of the monolith are aligned perpendicularly to the direction of gravity.

* * * * *